United States Patent [19]

Leader et al.

[11] Patent Number: 5,789,667
[45] Date of Patent: Aug. 4, 1998

[54] APPARATUS AND METHOD FOR TESTING ELECTRIC MOTORS

[76] Inventors: David N. Leader, 46 E. Wautoma Beach Rd., Hilton, N.Y. 14468; David M. Williams, 10071 Creek Rd., Pavilion, N.Y. 14525; William J. Ebersole, 5000 E. Henrieth Rd. #A-6, Henrieth, N.Y.

[21] Appl. No.: 846,048

[22] Filed: Apr. 25, 1997

[51] Int. Cl.⁶ .................................................. G01L 3/22
[52] U.S. Cl. ............................................................ 73/116
[58] Field of Search ........................... 73/116, 117.2, 73/117.3, 118.1, 865.9

[56] References Cited

U.S. PATENT DOCUMENTS

| | | | |
|---|---|---|---|
| 3,898,875 | 8/1975 | Knoop et al. | 73/116 |
| 5,355,716 | 10/1994 | Castelli | 73/12.01 |
| 5,435,168 | 7/1995 | Granere | 73/667 |

*Primary Examiner*—George M. Dombroske
*Attorney, Agent, or Firm*—Thomas Twomey; J. Gordon Lewis; Maggie Dobrowitsky

[57] ABSTRACT

To improve the recognition of defective electric motors, the present invention proposes a test apparatus and method comprising an accelerometer mounted on a member rotating with the output shaft of the motor under test. The accelerometer measures the acceleration in the direction of rotation. A communication path between the accelerometer and an electronic processor is provided to assign detected disturbances to certain known defect modes which have been obtained from sample defect motors. The communication path may comprise a slip ring contact.

The rotating accelerometer can detect disturbances caused by gear train defects that cannot be discovered by an accelerometer mounted on the motor housing in the known way.

12 Claims, 1 Drawing Sheet

APPARATUS AND METHOD FOR TESTING ELECTRIC MOTORS

BACKGROUND OF THE INVENTION

The present invention relates to an apparatus and a method for testing electrical motors furnished with a rotating output member such as an output shaft.

Such testing procedures are used to prevent installation of defective motors. Present technology involves the use of an accelerometer mounted on the motor case, the housing or another part rigidly coupled to the motor under test. While this technique is suitable for the detection of many defect modes, it is inadequate for the detection of gear train defects causing periodic disturbances recurring in the frequency of rotation. The limitation of the present technology is that, due to its mounting location, the accelerometer is immune to vibrations generated by non-circular geometry.

OBJECT OF THE INVENTION

An object of the present invention is to provide a test apparatus for electric motors which is capable to detect defect modes causing disturbances recurring in the frequency of rotation.

Another object of the invention is to provide a communication path between a rotating accelerometer and an electronic processor.

Another object of the invention is to describe a method for identification of non-circular running of a rotating member.

Still another object of the present invention is to realize identification of defects of electric motors by analyzing their defect modes even if these only appear under certain circumstances like application of a load.

SUMMARY OF THE INVENTION

The first of these objects is achieved by an apparatus comprising an accelerometer rotating with the output member of the motor and an electronic processor connected to the accelerometer by means of a communication path.

A reliable communication path is provided by a slipring arrangement wherein a stationary slipring embraces a cylindrical section of a part which rotates with the output member. The cylindrical section is connected to the accelerometer, while the slipring is connected to the electronic processor.

By means of locating the accelerometer in a rotating position, changes of the rotational acceleration, i.e. the acceleration in angular direction, can be detected within one revolution. Thus, even non-circular running causing periodic disturbances will be discovered.

If, in advance, such a measurement is carried out with sample motors having known defects, their modes can be stored and provided for comparison. In this way, deviations of the rotational acceleration can be analyzed and assigned to certain defects like different kinds of gear train defects.

In a preferred embodiment, a load is applied to the motor under test by exerting an adjustable force to the rotating member. This can be realized by another electric motor with an adjustable, preferably bidirectional, power output, but also by an induction or friction brake as well as by a variable inertia mass.

An analysis can be carried out by considering the obtained data in the time domain or transferring the results into the frequency domain to figure out the frequency spectrum of each disturbance.

Not only the rotational acceleration may be of interest, but also radial or axial accelerations. The target values of rotational and axial accelerations are equal to zero while the target value of the radial acceleration is determined by the centripetal force according to the angular velocity and the distance between the accelerometer and the axis of rotation.

If the evaluation of the accelerometer signals is not based on deviations of an acceleration, but of a velocity or a displacement, the target values should always be zero for axial and radial quantities. In angular direction, the velocity target value is a constant equal to the intended angular velocity multiplied by the distance between the accelerometer and the axis of rotation. An observation of a displacement in angular direction does not appear to be very reasonable since this displacement has no constant target value, but grows steadily.

The use of the accelerometer according to this invention does not exclude another accelerometer mounted on the motor housing or in another fixed position: The two signals obtained from these different positions complement each other regarding the defect modes which can be detected from the one or the other location.

Further details of the invention are provided by a detailed description of a preferred embodiment shown in two drawings.

DETAILED DESCRIPTION OF THE DRAWINGS

Figure 1:
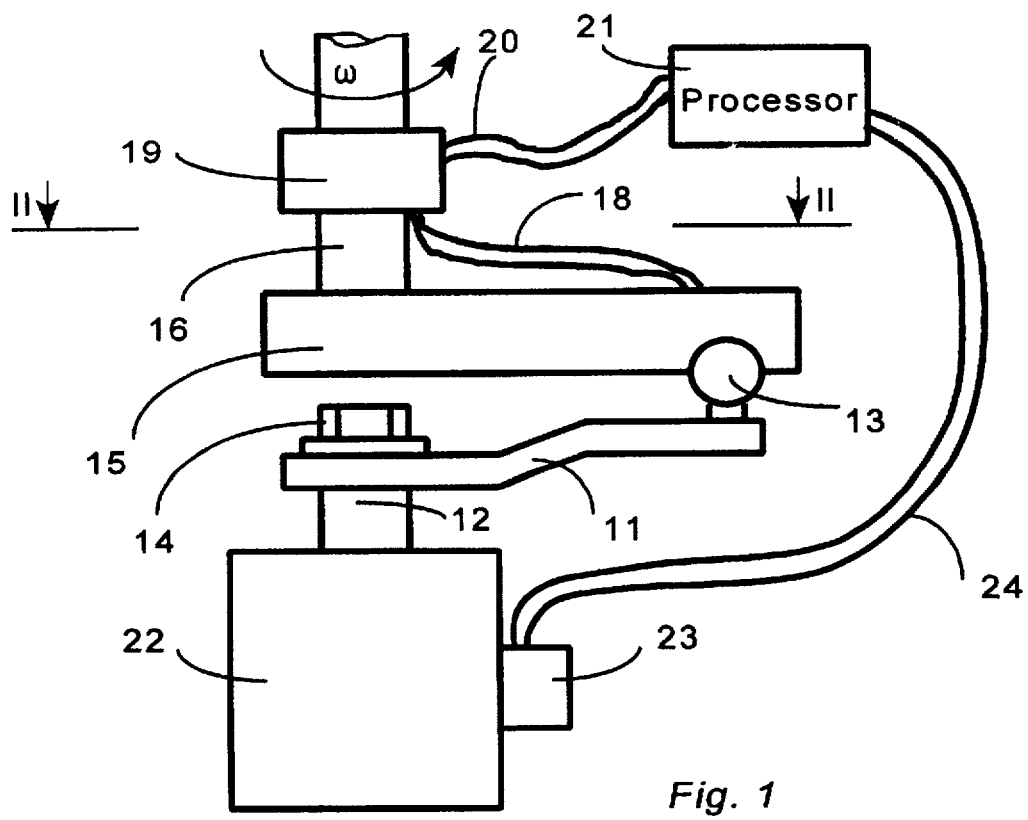
FIG. 1 shows a sectional view of a preferred embodiment of the invention in a plane perpendicular to the axis of rotation.
Figure 2:
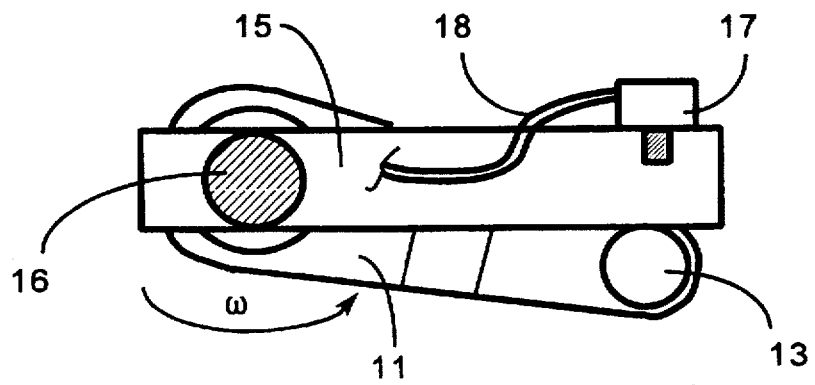
FIG. 2 shows the embodiment of FIG. 1 in a plane parallel to the axis of rotation.

FIGS. 1 and 2 show an arrangement for measuring a rotational acceleration, i.e. the acceleration in angular direction of a rotation.

A crank arm 11 is mounted on a rotatable output shaft 12 of an electric motor 22 by means of a nut 14. The electric motor 22 is fixed to the test setup by means of a clamp, not shown.

To the outer end of the crank arm 11, a linkball 13 is fixed. The linkball 13 axially projects beyond the nut 14 and overlaps a lever 15. The lever 15 is mounted on a rotatable shaft 16 which extends coaxially with the output shaft 12. The lever 15 abuts the linkball 13 from a side depending on the direction in which a load is applied. If, as shown, a counter-clockwise direction ω of rotation is chosen and the load is meant to work against the motor under test, the lever 15 is located in a counter-clockwise position with respect to the linkball 13. Presuming the same direction ω, the lever 15 is located on the other side of the linkball 13 if a load is to be applied in the direction of rotation.

By the way, a linkball 13 is only one of manifold possibilities to couple the two rotating shafts 12 and 16. If the motor under test does not comprise a crank arm, its output shaft can be connected to the lever 15 or to the rotating shaft 16 without an intermediate member.

On the side of lever 15 averted from the linkball 13, an accelerometer 17 is fastened to the lever 15 close to its outer end. The accelerometer 17 is mounted to be sensitive to an acceleration in the direction of rotation. In other words, the accelerometer 17 detects all changes of the angular velocity since it rotates with the lever 15.

A wire 18 connects the accelerometer 17 to the surface of the rotatable shaft 16 where a stationary slipring 19 makes a slip contact. For this purpose, the slipring 19 has an electrically conducting inner surface being in contact with the end of the wire 18. Another electric conductor 20 connects the inner surface of the slipring 19 to an electronic evaluation unit, the processor 21.

Another way to provide a communication path between the accelerometer 17 and the processor 21 consists in a wireless signal transmission by using an emitter of electromagnetic waves rotating with the accelerometer and a stationary receiver.

In the shown embodiment, the rotatable shaft 16 leads to another electric motor, not shown, which is part of the test assembly and capable to apply an adjustable load in both directions to the lever 15 and, by means of the crank arm 11, to the motor 22 under test. For each motor 22, only a unidirectional measurement with bidirectional load is required to detect possible gear train defects, but different motor types need different directions of rotation, depending on their intended use.

A second accelerometer 23 is mounted to the housing of the motor 22 under test by a permanent magnet.

An accelerometer type appropriate for both implementations indicated above is for instance PCB model J353B18.

The test is carried out as follows: Each motor 22 undergoes a measurement of accelerations at least at high speed, i.e. in general at a frequency in the range of 45–65 rpm. The first measurement takes place without applying a load. The free speed and the motor current are measured and compared to certain limits representing tolerance thresholds. After load is applied by the second electric motor, the frequency of rotation is stabilized, preferably by a feedback system. While the motor 22 is running at a fixed angular velocity, the signals of the two accelerometers 17 and 23 are monitored.

The signal from the accelerometer 23 mounted on the motor housing is transformed into the frequency domain. The derived values are averaged between 10 and 50 times and compared to both high and low limits. Considering the typical spectra of the vibrations caused by known defects, the deviations from the tolerance band can be decoded and assigned to certain defects. The frequency range considered comprises 50 to 200 values between 0 kHz and about 10 kHz.

For the detection of gear train defects, the signal of the acceleromter 17 rotating with the output shaft of the motor 22 under test is evaluated. Said gear train defects do not necessarily emerge without load and cannot be detected reliably with the accelerometer on the motor housing. The signals of the accelerometer 17 are analyzed in the time domain and compared to limits for pass-fail determination. The analysis in the time domain makes it possible to determine the phase of disturbance, i.e. the angular position of the output shaft in the moment in which the disturbance occurs.

An additional analysis in the frequency domain can be carried out as well for obtaining the characteristic spectrum of possible disturbances and determining the type of gear train defect by comparison to sample defect modes.

Preferably, the test assembly is provided with a display indicating whether the motor 22 has passed the test in which case preferably the clamp is released automatically. If a defect has been detected, the display indicates the type of defect which has been analyzed, and the clamp remains in the fixed position. The procedure will then be for the operator to initiate a retest without refixturing the motor 22.

After carrying out a series of tests on motors of identical type, the processor can provide a statistical type analysis including, for instance, the following pieces of information:

number of tested items;

total number and percentage of rejects;

number and percentage of rejects distributed to the different defect modes.

Although only one specific embodiment has been described, the invention is not limited to the details set forth above. For instance, the acceleration is not necessarily the quantity to be considered. The signal of the rotating accelerometer can be integrated by the time to obtain information about the angular velocity or, by a second integration, about the displacement of the accelerometer.

We claim:

1. An apparatus for testing electric motors, comprising a rotatable member adapted to be coupled to a rotating output member of an electric motor, a first accelerometer carried with the rotatable member in a position to generate output signals corresponding to at least the acceleration of the rotatable member in angular direction, a processor for evaluating the accelerometer output signals and a communication path interconnecting the accelerometer and the processor, a second accelerometer fixed to a stationary part of said electric motor.

2. The apparatus of claim 1, further comprising means for selectively applying a variable load to the rotatable member.

3. The apparatus of claim 2, wherein the load-applying means is an electric motor.

4. The apparatus of claim 1, wherein the rotatable member is a crank arm fixed to a rotatable shaft.

5. The apparatus of claim 1, wherein the communication path comprises a substantially cylindrical section and slip contact means, one of which is fixed to the rotatable member and rotating therewith and the other one of which is connected to the accelerometer.

6. The apparatus of claim 5 wherein the cylindrical section is carried with the rotating member and has a contact means connected to the accelerometer, and the slip contact means consists of a stationary slipring slidingly embracing the cylindrical section and having an electrically conducting surface being in continuous contact with the contact means and the conducting surface and the processor are connected via an electrical conductor.

7. A method for testing an electric motor with a rotating output member, comprising the following steps:

measuring the acceleration of the output member at least in angular direction, evaluating the measured acceleration by considering deviations from a predetermined behavior of at least one of the following quantities related to the acceleration: acceleration, velocity and displacement, wherein the predetermined behavior for the acceleration in angular direction is defined by a constant value equal to zero.

8. The method of claim 7 wherein the predetermined behavior for the acceleration in angular direction is defined by a constant value equal to zero.

9. The method of claim 7 wherein additionally the acceleration in radial direction respective to the rotation is measured and the predetermined behavior for the radial acceleration is defined by a constant value equal to the centripetal acceleration corresponding to the current angular velocity of the rotating member and the distance between the center of rotation and the place of measurement.

10. The method of claim 7 wherein a translation of the measured values into the frequency domain is carried out to determine the frequency spectra of possible disturbances.

11. The method of claim 7 wherein the deviations are compared to stored values of the same quantities empirically obtained from sample motors with known defects.

12. A method for testing an electric motor with a rotating output member, comprising the following steps:

measuring the acceleration of the output member at least in angular direction, evaluating the measured acceleration by considering deviations from a predetermined behavior of at least one of the following quantities related to the acceleration: acceleration, velocity and displacement, wherein additionally the acceleration in radial direction respective to the rotation is measured and the predetermined behavior for the radial acceleration is defined by a constant value equal to the centripetal acceleration corresponding to the current angular velocity of the rotating member and the distance between the center of rotation and the place of measurement.

* * * * *